(12) United States Patent
Dongara et al.

(10) Patent No.: US 9,652,019 B2
(45) Date of Patent: May 16, 2017

(54) SYSTEM AND METHOD FOR ADJUSTING PROCESSOR PERFORMANCE BASED ON PLATFORM AND AMBIENT THERMAL CONDITIONS

(71) Applicants: Advanced Micro Devices, Inc., Sunnyvale, CA (US); ATI Technologies ULC, Markham (CA)

(72) Inventors: Praveen K. Dongara, Austin, TX (US); Aniruddha Dasgupta, Austin, TX (US); Adam Clark, Victoria (CA)

(73) Assignees: Advanced Micro Devices, Inc., Sunnyvale, CA (US); ATI Technologies ULC, Markham (CA)

( * ) Notice: Subject to any disclaimer, the term of this patent is extended or adjusted under 35 U.S.C. 154(b) by 143 days.

(21) Appl. No.: 14/293,520

(22) Filed: Jun. 2, 2014

(65) Prior Publication Data

US 2015/0346798 A1 Dec. 3, 2015

(51) Int. Cl.
*G06F 1/32* (2006.01)
*G06F 1/20* (2006.01)

(52) U.S. Cl.
CPC ............ *G06F 1/3206* (2013.01); *G06F 1/206* (2013.01); *G06F 1/324* (2013.01); *G06F 1/3296* (2013.01); *Y02B 60/1275* (2013.01)

(58) Field of Classification Search
CPC ....................................................... G06F 1/32
See application file for complete search history.

(56) References Cited

U.S. PATENT DOCUMENTS

| | | | |
|---|---|---|---|
| 5,451,892 A | 9/1995 | Bailey | |
| 6,052,268 A | 4/2000 | Thomas | |

(Continued)

FOREIGN PATENT DOCUMENTS

| | | |
|---|---|---|
| WO | 02/25448 A3 | 3/2002 |
| WO | 2006073899 A2 | 7/2006 |
| WO | 2009114141 A1 | 9/2009 |

OTHER PUBLICATIONS

Atienza et al.; "Inducing Thermal-Awareness in Multicore Systems Using Networks-on-Chip", ISVLSI '09 Proceedings of the 2009 IEEE Computer Society Annual Symposium on VLSI, May 13, 2009, pp. 187-192, IEEE Computer Society, Washington D.C., USA.

(Continued)

*Primary Examiner* — Mohammed Rehman
(74) *Attorney, Agent, or Firm* — Rory D. Rankin; Meyertons, Hood, Kivlin, Kowert & Goetzel, P.C.

(57) ABSTRACT

A system and method for efficient management of operating modes within an integrated circuit (IC) for optimal power and performance targets. A semiconductor chip includes processing units each of which operates with respective operating parameters. Temperature sensors are included to measure a temperature of the one or more processing units during operation. A power manager determines a calculated power value independent of thermal conditions and current draw. The power manager reads each of a first thermal design power (TDP) value for the processing units and a second TDP value for a platform housing the semiconductor chip. The power manager determines a ratio of the first TDP value to the second TDP value. Additionally, the power manager determines another ratio of the first TDP value to the calculated power value. Using the measured temperature, the ratios and the calculated power value, the power manager determines a manner to adjust the operating parameters.

17 Claims, 4 Drawing Sheets

(56) References Cited

U.S. PATENT DOCUMENTS

| | | |
|---|---|---|
| 6,172,611 B1 | 1/2001 | Hussain et al. |
| 6,535,798 B1 | 3/2003 | Bhatia et al. |
| 6,662,136 B2 | 12/2003 | Lamb et al. |
| 7,064,994 B1 | 6/2006 | Wu |
| 7,106,696 B1 | 9/2006 | Lim et al. |
| 7,129,763 B1 | 10/2006 | Bennett et al. |
| 7,409,572 B1 | 8/2008 | Hung et al. |
| 7,426,649 B2 | 9/2008 | Brittain et al. |
| 7,463,993 B2 | 12/2008 | Finkelstein et al. |
| 7,552,346 B2 | 6/2009 | Aguilar, Jr. et al. |
| 7,802,120 B2 | 9/2010 | Conroy et al. |
| 7,882,369 B1 | 2/2011 | Kelleher et al. |
| 7,886,164 B1 | 2/2011 | Alben et al. |
| 8,356,197 B2 | 1/2013 | Allarey et al. |
| 8,793,512 B2 * | 7/2014 | Branover ............... G06F 1/206 327/512 |
| 8,971,004 B2 | 3/2015 | Roth et al. |
| 9,122,648 B2 | 9/2015 | Askar et al. |
| 2002/0087287 A1 | 7/2002 | Dai |
| 2003/0110423 A1 | 6/2003 | Helms et al. |
| 2003/0117759 A1 | 6/2003 | Cooper |
| 2005/0201188 A1 | 9/2005 | Donze et al. |
| 2005/0289292 A1 | 12/2005 | Morrow et al. |
| 2006/0161375 A1 | 7/2006 | Duberstein et al. |
| 2006/0200275 A1 | 9/2006 | Dong et al. |
| 2006/0242447 A1 | 10/2006 | Radhakrishnan et al. |
| 2006/0248355 A1 | 11/2006 | Thayer |
| 2007/0067136 A1 | 3/2007 | Conroy et al. |
| 2007/0156370 A1 | 7/2007 | White et al. |
| 2008/0005592 A1 | 1/2008 | Allarey et al. |
| 2008/0005603 A1 | 1/2008 | Buch et al. |
| 2008/0028244 A1 | 1/2008 | Capps et al. |
| 2008/0028778 A1 | 2/2008 | Millet |
| 2008/0168287 A1 | 7/2008 | Berry et al. |
| 2008/0228959 A1 | 9/2008 | Wang |
| 2008/0266585 A1 * | 10/2008 | Iwata ................... B41J 19/145 358/1.9 |
| 2009/0235108 A1 | 9/2009 | Gold et al. |
| 2009/0296342 A1 | 12/2009 | Matteson et al. |
| 2010/0064162 A1 * | 3/2010 | Rotem ................. G06F 1/206 713/340 |
| 2010/0073068 A1 | 3/2010 | Cho et al. |
| 2010/0115293 A1 * | 5/2010 | Rotem ................. G06F 1/206 713/300 |
| 2010/0154448 A1 | 6/2010 | Hay |
| 2011/0022833 A1 * | 1/2011 | Nussbaum ............. G06F 1/324 713/100 |
| 2011/0022857 A1 * | 1/2011 | Nussbaum ............. G06F 1/3203 713/300 |
| 2011/0106476 A1 | 5/2011 | Son et al. |
| 2011/0191602 A1 | 8/2011 | Bearden et al. |
| 2011/0301777 A1 | 12/2011 | Cox et al. |
| 2012/0066535 A1 | 3/2012 | Naffziger |
| 2012/0072749 A1 | 3/2012 | Conroy et al. |
| 2012/0096288 A1 | 4/2012 | Bates et al. |
| 2012/0109550 A1 * | 5/2012 | Naffziger ............ G06F 1/3206 702/61 |
| 2012/0110352 A1 | 5/2012 | Branover et al. |
| 2012/0290135 A1 | 11/2012 | Bentivegna et al. |
| 2013/0024713 A1 * | 1/2013 | Bajic ................... G06F 1/3206 713/340 |
| 2013/0076381 A1 | 3/2013 | Takayanagi et al. |
| 2013/0117590 A1 | 5/2013 | Allen-Ware et al. |
| 2013/0120930 A1 | 5/2013 | Temkine et al. |
| 2013/0159755 A1 * | 6/2013 | Presant ................. G06F 1/206 713/340 |
| 2013/0246820 A1 | 9/2013 | Branover et al. |
| 2014/0103125 A1 | 4/2014 | Wyatt |
| 2014/0163765 A1 * | 6/2014 | Jain ...................... G06F 1/206 700/300 |
| 2014/0240031 A1 | 8/2014 | Vadakkanmaruveedu et al. |
| 2014/0371944 A1 | 12/2014 | Vadakkanmaruveedu et al. |
| 2015/0006937 A1 | 1/2015 | Rotem et al. |

OTHER PUBLICATIONS

International Search Report and Written Opinion in International Application No. PCT/US2011/057640, mailed Feb. 6, 2012, 12 pages.

International Search Report and Written Opinion in International Application No. PCT/US2008/009102, mailed Dec. 4, 2008, 13 pages.

International Preliminary Report on Patentability in Internationl Application No. PCT/US2008/009102, mailed Jan. 11, 2010, 7 pages.

Notice of Allowance in U.S. Appl. No. 14/277,394, mailed Feb. 7, 2017, 19 pages.

* cited by examiner

SYSTEM AND METHOD FOR ADJUSTING PROCESSOR PERFORMANCE BASED ON PLATFORM AND AMBIENT THERMAL CONDITIONS

BACKGROUND

Technical Field

This invention relates to computing systems, and more particularly, to efficient management of operating modes within a semiconductor chip for optimal power and performance targets.

Description of the Relevant Art

The power consumption of modern integrated circuits (IC's) has become an increasing design issue with each generation of semiconductor chips. As power consumption increases, more costly cooling systems, such as larger fans and heat sinks, must be utilized in order to remove excess heat and prevent IC failure. However, cooling systems increase system costs. The IC power dissipation constraint is not only an issue for portable computers and mobile communication devices, but also for high-performance microprocessors, which may include multiple processor cores, or cores, and multiple pipelines within a core.

A power management unit (PMU) for an IC may disable portions of the IC when it detects or is otherwise informed that the portion is unused for a given period of time. Similarly, power-performance states (P-states) or dynamic voltage and frequency scaling (DVFS) techniques may be adjusted based on usage feedback of one or more processing units. These portions or processing units usually refer to general-purpose processors, graphics processors, and other processing units (although more gross or finer granularities are possible). Algorithms for the adjustments may assume worst-case thermal conditions. However, during typical usage and environment, the worst-case thermal conditions may not actually apply. Consequently, lower performance states may unnecessarily be selected during these times due to the assumptions in the algorithms.

In view of the above, efficient methods and systems for efficient management of operating modes within an IC for optimal power and performance targets are desired.

SUMMARY OF EMBODIMENTS

Systems and methods for efficient management of operating modes within an IC for optimal power and performance targets are contemplated.

In various embodiments, a semiconductor chip includes one or more processing units each of which operates with respective operating parameters. The operating parameters may include power performance states (P-states) for a given processing unit or dynamic voltage and frequency scaling (DVFS) parameters for multiple processing units. One or more temperature sensors are included to measure a temperature of the one or more processing units during operation.

A power manager on the semiconductor chip determines a calculated power value based on activity level data from each of the one or more processing units, wherein the calculated power value is independent of thermal conditions and current draw. The power manager reads each of a first thermal design power (TDP) value for the one or more processing units and a second TDP value for a platform housing the semiconductor chip. The power manager determines a first ratio of the first TDP value to the second TDP value. Additionally, the power manager determines a second ratio of the first TDP value to the calculated power value. The power manager calculates a multiplicative product with the first ratio, the second ratio and the calculated power value. The product is referred to as a scaled calculated power value.

The power manager on the semiconductor chip determines whether or not the measured temperature provided by the temperature sensors exceeds a threshold. When the measured temperature exceeds the threshold, the power manager determines a temperature headroom utilizing temperature values based on worst-case ambient temperature. When the measured temperature does not exceed the threshold, the power manager determines the temperature headroom utilizing at least one temperature value based on room ambient temperature. In both cases, the scaled calculated power value is also used to determine the temperature headroom. Following, the power manager adjusts the respective operating parameters based on the temperature headroom.

These and other embodiments will be further appreciated upon reference to the following description and drawings.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

It will be appreciated that for simplicity and clarity of illustration, elements shown in the figures have not necessarily been drawn to scale. For example, the dimensions of some of the elements are exaggerated relative to other elements.

Terminology. The following paragraphs provide definitions and/or context for terms found in this disclosure (including the appended claims):

In the detailed description that follows, references to "one embodiment," "an embodiment," "an example embodiment," etc., indicate that the embodiment described includes a particular feature, structure, or characteristic. However, it is to be understood that not every embodiment necessarily includes the particular feature, structure, mode of operation, or characteristic. Moreover, such phrases are not necessarily referring to the same embodiment. Alternate embodiments is devised without departing from the scope of the disclosure, and well-known elements of the disclosure may not be described in detail or is omitted so as not to obscure the relevant details. Further, when a particular feature, structure, or characteristic is described in connection with an embodiment, it is submitted that it is within the knowledge of one skilled in the art to affect such feature, structure, or characteristic in connection with other embodiments whether or not explicitly described. In addition, the description refers to particular embodiments as having particular characteristics or performing particular actions using terms such as "does", "is", "uses", "utilizes", or otherwise. However, it is to be understood that various embodiments do not have the described characteristics or perform the described actions. Rather, alternate embodiments are devised without departing from the scope of the disclosure as noted above.

In addition to the above, the terminology used herein is for the purpose of describing particular embodiments only and is not intended to be limiting of the disclosure. For example, as used herein, the singular forms "a," "an" and "the" are intended to include the plural forms as well, unless the context clearly indicates otherwise.

It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to. As used in the appended claims, these terms do not foreclose additional structure or steps. Consider a claim that recites: "A computing system comprising one or more processor cores . . . . " Such a claim does not foreclose the computing system from including additional components (e.g., a GPU, one or more memory devices).

"Configured To." Various units, circuits, or other components is described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" also includes adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that affect a determination. That is, a determination is solely based on those factors or based, at least in part, on those factors. Consider the phrase "determine A based on B." While B is a factor that affects the determination of A, such a phrase does not foreclose the determination of A from also being based on C. In other instances, A is determined based solely on B.

For semiconductor chips, the thermal design power (TDP) represents a maximum amount of power a semiconductor chip is able to consume while maintaining safe operation. The TDP may also be referred to as a thermal design point. The semiconductor chip is able to dissipate the TDP value without exceeding the maximum junction temperature for transistors within the semiconductor chip. In one example, a semiconductor chip a laptop may be designed for a 20 watt TDP. Therefore, it has been determined that the semiconductor chip is able to dissipate 20 watts during operation in the without exceeding the maximum junction temperature for transistors.

A platform may house the semiconductor chip, such as in a laptop, a desktop computer, a server, a smart phone, a gaming console, and so forth. The platform may include at least a motherboard, a heat sink for the semiconductor chip, one or more fans, an off-chip controller for system power management, and so forth. The platform may be able to dissipate a lower, a same, or a higher TDP value than the TDP value for the semiconductor chip. For example, the semiconductor chip may have a TDP value of 35 watts. A first platform may be able to dissipate 30 watts. A second platform may be able to dissipate the same 35 watts as the TDP of the semiconductor chip. A third platform may be able to dissipate 40 watts. A mismatch between the semiconductor chip and the platform may cause constant throttling of processing units on the semiconductor chip or loss of available performance boosting.

Typically, the semiconductor chip is able to dissipate a maximum power, which is larger than the thermal design power (TDP). To prevent failure, the semiconductor chip operates within the TDP value. This TDP value may be used within logic in a power management unit to select one or more operating modes. The power management unit may also be referred to as a power manager. The power manager may be on-chip, but alternatively, the power manager may be located off-chip.

An operational voltage and clock frequency combination for a given processing unit on the semiconductor chip may be chosen by the power manager based at least on the TDP value and an estimated power consumption value. This combination of operational voltage and clock frequency may be referred to as a power-performance state (P-state). Alternatively, the semiconductor chip may be a system-on-a-chip (SOC) with multiple processing units, such as general-purpose processing units (CPUs), graphics processing units (GPUs), and other types of processing units. Each of the processing units may have a respective P-state and the power manager utilizes dynamic voltage and frequency scaling (DVFS) techniques for selecting operational parameters for the multiple processing units.

The microarchitecture and circuit-level design techniques for balancing power consumption and performance of the semiconductor chip are aided by methods to estimate the power consumption of processing units within the semiconductor chip in real-time. These methods may measure an activity level of processing units on the semiconductor chip.

While running one or more software applications, the real-time estimated power consumption of a processing unit is conveyed to the power manager. The power manager may include one or more units with control logic for balancing reduced power consumption and increased performance for the semiconductor chip. For a given processing unit, the power manager may select one discrete power-performance state (P-state) from several given discrete P-states.

The P-state selected by the power manager may be between a maximum performance state and a minimum power state. The maximum performance state includes a maximum operating clock frequency and the minimum power state includes a minimum operating clock frequency. The intermediate discrete power-performance states (P-states) include given scaled values for a combination of the operating frequency and the operational voltage. An illustration of transitioning between the P-states is provided below.

Figure 1:
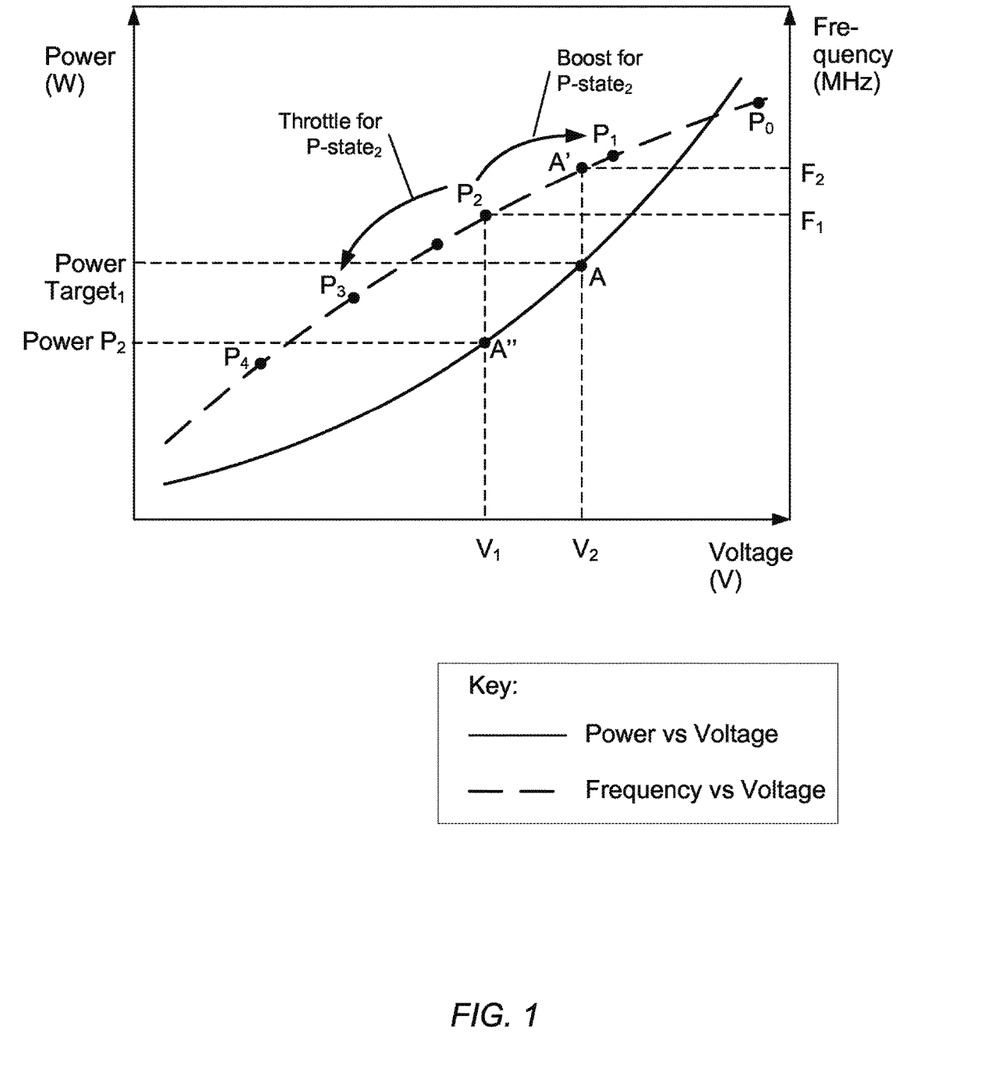
FIG. 1 is a generalized diagram of one embodiment of power-performance state transitions for a semiconductor chip.

Referring to FIG. 1, one embodiment of power-performance state transitions 100 for a semiconductor chip is shown. Two curves are shown in the diagram showing non-linear (e.g., cubic or quadratic) relationships between power versus voltage and frequency versus voltage. Five discrete power-performance states (P-states) are shown in the diagram denoted as P0 to P4. A small number of discrete P-states are shown to simplify the diagram. Although only five discrete P-states are shown, it is well known another number of discrete P-states may be supported.

In the diagram shown, the P-state $P_4$ may correspond to a discrete state with a lowest performance of all the supported discrete states and comprises the lowest operational frequency. In addition, the P-state $P_4$ may correspond to a discrete state with a lowest power consumption of all the supported discrete states and comprises the lowest operational voltage. On the other hand, the P-state $P_0$ may correspond to a discrete state with a highest performance of all the supported discrete states and comprises the highest operational frequency. In addition, the P-state $P_0$ may correspond to a discrete state with a highest power consumption of all the supported discrete states and comprises the highest operational voltage. Typically, the endpoint discrete states represented by P-states $P_0$ and $P_4$ define a region of predictable performance. Therefore, configuring the semiconductor chip to support multiple P-states, or operating points, along the non-linear frequency versus voltage curve may provide stable, optimal utilization of power and delivery of performance for the semiconductor chip, such as a processor. The management of the P-states may conform to an industry standard such as the Advanced Configuration and Power Interface (ACPI) standard, originally developed by Intel Corp., Microsoft Corp., and Toshiba Corp., but development also now includes Hewlett-Packard Corp. and Phoenix Corp. The standard was last published as Revision 4.0a on Apr. 5, 2010.

As shown in the diagram, a power $target_1$ may be chosen for the chip, wherein the power $target_1$ represents the TDP value for the chip. As described earlier, a thermal design power (TDP) may represent an amount of power that a cooling system is able to dissipate without exceeding the maximum junction temperature for transistors within the chip. As shown in FIG. 1, the power $target_1$ corresponds to a data point A on the power versus voltage non-linear curve. Data point A corresponds to an operating voltage $V_2$. Projecting data point A onto the non-linear frequency versus voltage curve with respect to the operating voltage $V_2$ provides data point A'. The data point A' corresponds to an operating frequency $F_2$. The operating point represented by the combination of the operating voltage $V_2$ and the operating frequency $F_2$ may provide an optimal utilization of power and delivery of performance for the chip.

As described above and shown in the diagram, an operating point for power $target_1$ is identified by data point A'. However, this operating point is not represented by a discrete P-state on the power versus frequency curve. The data point A' is located between the P-states $P_1$ and $P_2$. In order to reduce power consumption, the P-state $P_2$ may be chosen as an initial operating point for the corresponding chip. A corresponding combination of the operating voltage $V_1$ and the operating frequency $F_1$ may be the resulting chosen operating point.

A chip, such as a processor, may continue processing workloads utilizing an initially assigned P-state until either (i) the workload significantly changes which causes a significant change in a reported activity level or (ii) a power consumption tracking value reaches a given threshold. For example, if a processor is executing instructions for a workload that causes a consistent activity level over time, the accumulated effect of the workload may cause a power detection system within the processor to reach a given high threshold. This threshold may indicate the processor is generating significant heat and the power should be reduced. In one embodiment, a power manager, which may be located within the processor, may detect this condition and accordingly choose a different P-state corresponding to a lower power-performance operating point.

A "throttle" of a P-state includes decrementing the currently selected P-state by one P-state to a lower power consumption P-state. In contrast, a "boost" of a P-state includes incrementing the currently selected P-state by one P-state to a higher performance P-state. Throttling the P-state $P_2$ includes transitioning the currently selected P-state $P_2$ to the lower power-performance state $P_3$. A simple illustration of boosting and throttling a given P-state, such as the P-state $P_2$ as an example, is shown in FIG. 1. In some embodiments, each boost operation and each throttle operation may cause a currently selected P-state to transition by two or more P-states when the logic supports this added complexity. The P-state transitions may be controlled by logic within a power manager, and thereby is a self-contained system. However, the power manager may also be an external unit.

Figure 2:
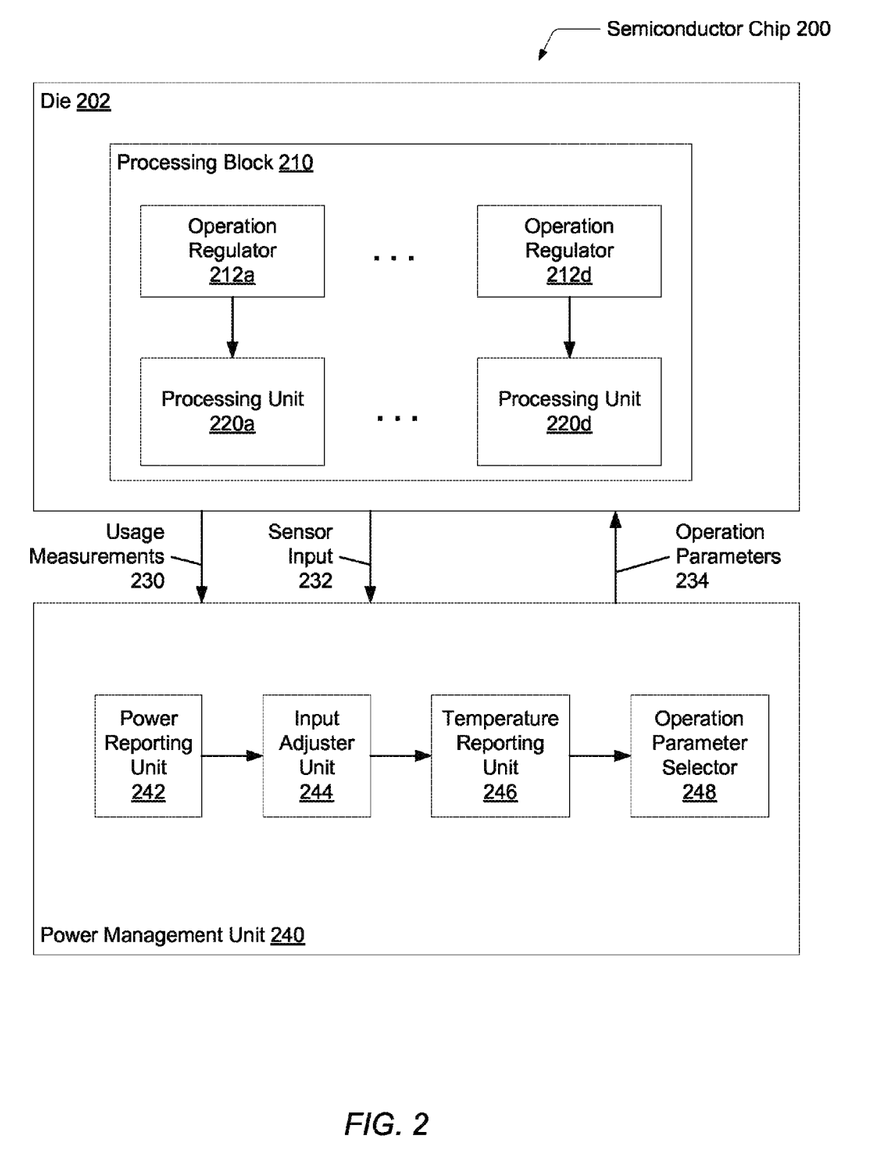
FIG. 2 is a generalized block diagram of one embodiment of a semiconductor chip.

Turning to FIG. 2, one embodiment of a generalized block diagram of a semiconductor chip 200 is shown. Die 202 may comprise a processing block 210 coupled to a power management unit 240. In some embodiments, the power management unit 240 is located on the die 202. In other embodiments, the power management unit 202 is located off-chip as shown. The processing block 210 may comprise processing units 220a-220d. One or more of the processing units 220a-220d may operate on a separate voltage plane. In various embodiments, each of the processing units 220a-220d may operate on a separate voltage plane. Accordingly, each one of the processing units 220a-220d may be coupled to a separate and respective one of the voltage regulators 212a-212d. Interfaces for die 202 used to communicate with other components such as a memory controller, a network interface card (NIC), peripheral devices, and so forth, are not shown for ease of illustration. Any transistor family may be use to implement die 202. Examples include metal oxide semiconductor field effect transistors (MOSFETs) and bipolar junction transistors (BJTs).

In various embodiments, each one of the processing units 220a-220d is a processor, such as a general-purpose processor, a graphics processor, digital signal processor (DSP), a special-purpose coprocessor, and so forth. Alternatively, one or more of the processing units 220a-220d may be an application specific integrated circuit (ASIC). In such embodiments, the semiconductor chip 200 is a system-on-a-chip (SOC) that integrates multiple functions into a single integrated chip substrate. The functions may include digital, analog, mixed-signal and radio-frequency (RF) functions. Typical applications are used in the area of embedded systems. Energy-constrained cellular phones, portable communication devices and entertainment audio/video (A/V) devices are some examples of systems using an SOC. In other embodiments, the die 202 is a processor and each one of the processing units 220a-220d is a similar core within the processor.

In embodiments with at least a given one of the processing units 220a-220d as a general-purpose processor, the given processing unit includes one or more general-purpose cores. Each core may include circuitry for executing instructions according to a predefined instruction set. For example, the x86 instruction set architecture (ISA) may be selected. Alternatively, the x86-64®, Alpha®, SPARC®, PowerPC®, MIPS®, PA-RISC®, or any other instruction set architecture may be selected. Generally, processor cores access a cache memory subsystem for data and instructions.

In embodiments with at least a given one of the processing units 220a-220d as a graphics processing unit (GPU), the given processing unit includes one or more cores with a parallel architecture, such as a single instruction multiple data (SIMD) core. The cores may utilize very wide single instruction multiple data (SIMD) architectures to achieve high throughput in image-rendering applications. The cores may access dedicated storage buffers for data and instructions. The GPU may be a dedicated graphics-rendering device for a personal computer, a workstation, or a video game console.

A power target, such as the thermal design power (TDP), may be assigned to die 202. It has been determined that the die 202 is able to operate while consuming the TDP value without exceeding the maximum junction temperature for transistors within the die 202. In various embodiments, a power model executed on a pre-silicon model of the die 202 may perform a power measurement. Later in a design cycle, power measurements may be performed on actual fabricated silicon dies during a testing phase and debugging phase. A peak power value for die 202 may be defined by functional failure of the die 202 executing a high power virus application on the core. A de-rated form of a high power virus application may be used to set the thermal design power (TDP) of the die 202. This de-rated code and its corresponding power consumption may be used to set the operational voltage and frequency of each one of the processing units 220a-220d for binning purposes.

In various embodiments, the power management unit 240 may associate a total number of power credits for die 202 to the TDP value for die 202. The power management unit 240 may allocate a separate given number of power credits to each one of the processing units 220a-220d. A sum of the associated power credits equals the total number of power credits for die 202. The power management unit 240 may be configured to adjust the number of power credits for each one of the processing units 220a-220d over time. These adjustments may be based on a power profile conveyed from each one of the processing units 220a-220d to the power management unit 240.

Continuing with the allocation of power credits, each one of the processing units 220a-220d may determine a corresponding power consumption number during each given time interval. Any of a variety of techniques may be utilized to determine power consumption of a given one of the processing units 220a-220d. In various embodiments, one or more of the processing units 220a-220d may sample a number of pre-selected signals. The selection of which signals to sample during a particular clock cycle may correspond to how well the selection correlates to the amount of switching node capacitance within a given one of the processing units 220a-220d. For example, in one embodiment, clock enable signals routed to local clock distribution blocks may be the signals chosen to be sampled and to provide reliable and accurate power usage values.

Sampled data points corresponding to the sampled signals may be taken during each given intermittent cycle. Multiple samples are taken during a sample interval. The determination of the number of intermittent cycles to use may depend on the desired accuracy and confidence of the sampled data. For example, analysis including simulations and/or execution may be used to generate data on power consumption. Based on analysis, a table may be generated using both statistical analysis and measurements of both the real power consumption of an application and estimated power consumption from a sampling. In various embodiments, the table may be programmable (e.g., to adjust weights applicable to signals) in order to account for better estimates or otherwise. A confidence level and an error rate may be chosen to further develop the statistical analysis. Based on such analysis, selected signals may be chosen for sampling during operation.

In various embodiments, existing or additional logic may be added to the design for the purpose of sampling and/or maintaining counts (e.g., using flops) corresponding to these signals. These selected signals may be selected for sampling based upon a determination that they have a relatively significant impact on power consumption. For example, various clock enable signals, bus driver enables, mismatches in content-addressable memories (CAM), and CAM word-line (WL) drivers may be chosen for sampling. In one embodiment, a count may be maintained for such signals during operation (e.g., when a clock enable is asserted). Based on these counts, an estimate of power consumption corresponding to the counts may be determined. For example, a table such as that described above may be used to correlate counts with estimated power consumption. In such an embodiment, the estimated power consumption would not, for example, be based on measures of thermal conditions or current draw. Various examples of a power estimation are described in patent application Ser. No. 12/101,598, filed Apr. 11, 2008, entitled "Sampling Chip Activity for Real Time Power Estimation", the entirety of which is incorporated herein by reference.

The processing block 210 may send at least activity level measurements or data, such as the above described count data, to the power management unit 240. These values are shown as usage measurements 230 in FIG. 2. Additionally, the processing block 210 may send sensor measured temperature values to the power management unit 240. These measured temperature values are shown as sensor input 232 in FIG. 2. In various embodiments, the die 202 may utilize analog or digital thermal sensors placed throughout the die 202. The thermal sensors provide information as to when the die heats up in a particular area due to increased compute activity. These sensors respond to each change in thermals, whether it's driven by a compute-related boost in power consumption in one or more of the processing units 220a-220d or by an external environmental factor, such as a rise in ambient temperature. However, when worst-case ambient temperature conditions are not a factor, the temperature sensors can detect these scenarios. The resulting information is sent to the power management unit 240.

As shown, the power management unit 240 includes a power reporting unit 242, an input adjuster unit 244, a temperature reporting unit 246 and an operation parameter selector 248. Control logic within the power reporting unit 242 receives activity levels sampled or measured during a given time interval. The power reporting unit 242 calculates a power value from the usage measurements 230 received from activity monitors in the processing units 220a-220d. The power reporting unit 242 may also calculate a leakage power value to include in a total power value. The leakage power value is dependent on a calculated temperature. The calculated temperature is determined by the temperature reporting unit 246 and utilizes a worst-case ambient temperature value. When the sensor-measured temperature is significantly different from the calculated temperature, the calculated power value does not change.

The calculated power value is sent to the temperature reporting unit 246. The temperature reporting unit 246 utilizes both the received calculated power value and input values from the input adjuster unit 244. Before further describing the temperature reporting unit 246, a description of the input adjuster unit 244 is given. In various embodiments, the input adjuster unit 244 receives a TDP value for the platform and a nominal TDP value for the die 202. The TDP value for the platform may be stored in basic input/output software (BIOS), in configuration and status registers on the motherboard, or in other locations. The power management unit 240 may send a request or a command for the platform TDP value. The nominal TDP value for the die 202 may be stored in fuses for the die 202.

The input adjuster unit 244 may compare the platform TDP value and the nominal TDP value for the die 202. When a mismatch is determined, the input adjuster unit 244 calculates a scalar value to send to the temperature reporting unit 246. The scalar value is used to scale the calculated power value. Alternatively, the input adjuster unit 244 may scale the calculated power value with the scalar value and send the result to the temperature reporting unit 246.

In some embodiments, the scalar value is a ratio of the nominal TDP value of the die 202 to the platform TDP value. For example, the platform may provide a heat sink, fans, and other power management solutions to dissipate 22 watts of power for the semiconductor chip 200. The semiconductor chip 200 on the platform may have a nominal TDP value of 25 watts. Therefore, the scalar value is 25/22, or 1.136. If the power reporting unit 242 determines the calculated power value is 22 watts from the usage measurements 230, then the temperature reporting unit receives a scaled power value of 22 watts×(25/22), or 25 watts. The scalar value may provide fine-grained configurability of the scaled calculated power value. In some embodiments, the fine-grained configurability includes steps of 100 milliwatts (mW).

The use of the fine-grained configurability of the scaled calculated power value provides flexibility to semiconductor chips traditionally defined to be at a fixed nominal TDP value. Now, these semiconductor chips may be efficiently used in platforms that have thermal solutions designed for higher or lower TDP values than the nominal TDP for the chips. For example, now a semiconductor chip with a nominal TDP value of 35 watts is efficiently used in platforms providing TDP values of 30 watts or 40 watts.

Without the fine-grained configurability, the semiconductor chip with a 35-watt nominal TDP value being used in a 30-watt platform would throttle processing units to low-performance states resulting in low performance for the chip and the platform. Without the fine-grained configurability, the semiconductor chip with a 35-watt nominal TDP value being used in a 40-watt platform would not benefit from the extra cooling capability of the platform. The chip would match the performance provided by its 35-watt nominal TDP value, rather than a higher TDP value available by the cooling solution of the 40-watt platform.

Continuing with the description of the units within the power management unit 240, the temperature reporting unit 246 receives the scaled calculated power value. The temperature reporting unit 246 translates the received value to a calculated die temperature value. The temperature reporting unit 246 may utilize a transient resistor-capacitance (RC) thermal model for the translation. The RC thermal model typically utilizes a worst-case ambient temperature. In some embodiments, the worst-case ambient temperature may be 35 degrees Celsius.

The calculated temperature value is sent to the operation parameter selector 248. Alternatively, a calculated boost value is sent to the operation parameter selector 248. For example, the temperature reporting unit 246 may determine from the calculated power value that the calculated temperature is 98 degrees Celsius. The temperature reporting unit 246 may send the value of 98 degrees Celsius to the operation parameter selector 248. Alternatively, the temperature reporting unit 246 may calculate and send the boost value to the operation parameter selector 248.

In some embodiments, the operation parameter selector 248 may use the received calculated temperature value to determine the boost value, which may be the difference between the maximum temperature limit and the calculated temperature. The maximum temperature value may be based on the nominal TDP for the die 202 and the transistor junction breakdown temperature for the die 202. In some embodiments, the maximum temperature value is 100 degrees Celsius. In this example, when the maximum temperature limit is 100 degrees Celsius, the boost value is (100−98), or 2 degrees Celsius.

The operation parameter selector 248 receives the calculated temperature value or the boost value, and accordingly selects a set of operation parameters for the processing units 220a-220d based on the received value. The power management unit 240 sends the selected operation parameters 234 to the die 202. In various embodiments, the operation parameters 234 are P-state values. The selection of the operation parameters may dynamically modulate the operational voltage and operational clock frequency combination to vary power consumption of the die 202 such that the scaled calculated power value causes the calculated temperature value to reach a maximum temperature value in the next time interval. Therefore, a feedback loop is created among the unit 248, processing units 220a-220d, and the unit 242.

As described earlier, scaling the calculated power value is a method for accessing available performance in the system despite the differences between platform and chip thermal capabilities. Scaling the calculated power value may also occur when the chip and the platform utilize same thermal capabilities. For example, the nominal TDP of the chip may be 35 degrees Celsius and the thermal capabilities of the platform may provide a TDP value of 35 degrees Celsius. However, scaling the calculated power value may still occur. Similarly, when the chip and the platform utilize different thermal capabilities, further scaling of the calculated power value may occur in addition to the scaling described earlier. For example, the nominal TDP of the chip may be 35 degrees Celsius and the thermal capabilities of the platform may provide a TDP value of 30 degrees Celsius. A first scalar value may be the ratio of the chip nominal TDP to the platform TDP, such as 35/30 or 1.167 in this example. A further second scalar value may be determined. The further scaling of the calculated power value may occur when the ambient temperature significantly differs from worst-case conditions.

The semiconductor chip 200 may operate with ambient temperature significantly lower than the worst-case ambient temperature. For example, the semiconductor chip 200 may operate with room ambient temperature. The translation of the calculated power value to the calculated temperature value in the RC thermal model utilizes the worst-case ambient temperature. Therefore, the temperature reporting unit 246 conservatively uses the assumption that the die 202 continually operates under worst-case temperature conditions, such as the worst-case ambient temperature. However, under thermal conditions with room ambient temperature, such as 23 degrees Celsius versus the worst-case 35 degrees Celsius, the actual temperature of die 202 may significantly be different from each of the calculated temperature and the maximum temperature limit. For example, the difference between the worst-case ambient temperature of 35 degrees Celsius and room ambient temperature of 23 degrees Celsius is 12 degrees Celsius. The difference of 12 degrees Celsius may not be used for boosting P-states under the approach of using conservative worst-case calculations. Therefore, the feedback loop and the adjustment of the operation parameters do not increase performance of die 202 as available under the room ambient temperature condition. However, the measured sensor temperature may be used to adjust the conservative worst-case approach and access the additional available performance gains.

As described earlier, the processing block 210 may send sensor measured temperature values to the power management unit 240. These measured temperature values are shown as sensor input 232 in FIG. 2. The die 202 may utilize analog or digital thermal sensors placed throughout the die 202. The thermal sensors provide information as to when the die heats up in a particular area due to increased compute activity by one or more of the processing units 220a-220d or by an external environmental factor, such as a rise in ambient temperature. However, when worst-case ambient temperature conditions are not a factor, the temperature sensors can also detect these scenarios.

The input adjuster unit 244 receives the sensor input 232, which is the sensor measured temperature value. The accuracy of the on-die temperature sensors may influence the available temperature margin used for extra boosting of the operation parameters. The high temperature reporting sensors have an over-reporting error. Similarly, the low temperature reporting sensors have an under-reporting error. For example, these errors may have an appreciable magnitude of 4 degrees Celsius.

In various embodiments, the sensor measured temperature value sent to the input adjuster unit 244 is compared to a temperature threshold. In some embodiments, the temperature threshold is a difference between the maximum temperature limit and the magnitude of the under-reporting error of the temperature sensors. Again, the maximum temperature value may be based on the TDP and the transistor junction breakdown temperature for the die 202. In some embodiments, the maximum temperature value is 100 degrees Celsius. If the magnitude for under-reporting error for the on-die temperature sensors is 4 degrees Celsius, then the temperature threshold for this example is (100−4), or 96 degrees Celsius. Additionally, other formulas and values for the temperature threshold are possible and contemplated.

If the sensor measured temperature value sent to the input adjuster unit 244 is less than a temperature threshold, then the input adjuster unit 244 may indicate to the temperature reporting unit 246 that an extra margin is to be added to a calculated boost value. In some embodiments, the extra margin is a difference between (i) a difference between the worst-case ambient temperature and the room ambient temperature and (ii) a sum of the magnitudes of the temperature sensor over-reporting error and the under-reporting error. For example, with the values used earlier, the extra margin would be (35−23)−(4+4), or 12−8, or 4 degrees Celsius. The extra margin of 4 degrees Celsius would be added to the original boost value. For example, if the temperature threshold is 96 degrees Celsius and the calculated temperature is 94 degrees Celsius, then the extra boost value of 4 degrees Celsius would be added to the original boost value of (100−94), or 6 degrees Celsius for a total boost value of (6+4), or 10 degrees Celsius. The total boost value of 10 degrees Celsius is sent to the operation parameter selector 248.

The temperature headroom for boosting may be based on at least a maximum temperature limit, Tmax; room ambient temperature, Troom-ambient; and the on-die sensor errors. The temperature headroom may be represented by the expression:

$$T\text{max}-(T\text{calc}-T\text{extra-margin})=(T\text{max}-T\text{calc})+T\text{extra-margin}$$

The value Textra-margin may be represented by the expression:

$$(T\text{worst-case-ambient}-T\text{room-ambient})-T\text{under-reporting}-T\text{over-reporting}=(T\text{worst-case-ambient}-T\text{room-ambient})-(|T\text{under-reporting}|+|T\text{over-reporting}|)$$

The calculated boost value is sent to the operation parameter selector 248. Alternatively, the calculated temperature value is sent to the operation parameter selector 248 where the calculated boost value is determined. For example, the temperature reporting unit 246 may determine from the calculated power value that the calculated temperature is 98 degrees Celsius.

The operation parameter selector 248 receives the calculated temperature value or the boost value, and accordingly selects a set of operation parameters for the processing units 220a-220d based on the received value. The power management unit 240 sends the selected operation parameters 234 to the die 202. In various embodiments, the operation parameters 234 are P-state values. The selection of the operation parameters may dynamically modulate the operational voltage and operational clock frequency combination to vary power consumption of the die 202 such that the calculated power value causes the calculated temperature value to reach or maintain a maximum temperature value in the next time interval. Therefore, a feedback loop is created among the unit 248, processing units 220a-220d, and the unit 242. As described earlier, the maximum temperature value may be based on the TDP and the transistor junction breakdown temperature for the die 202. In some embodiments, the maximum temperature value is 100 degrees Celsius.

Figure 3:
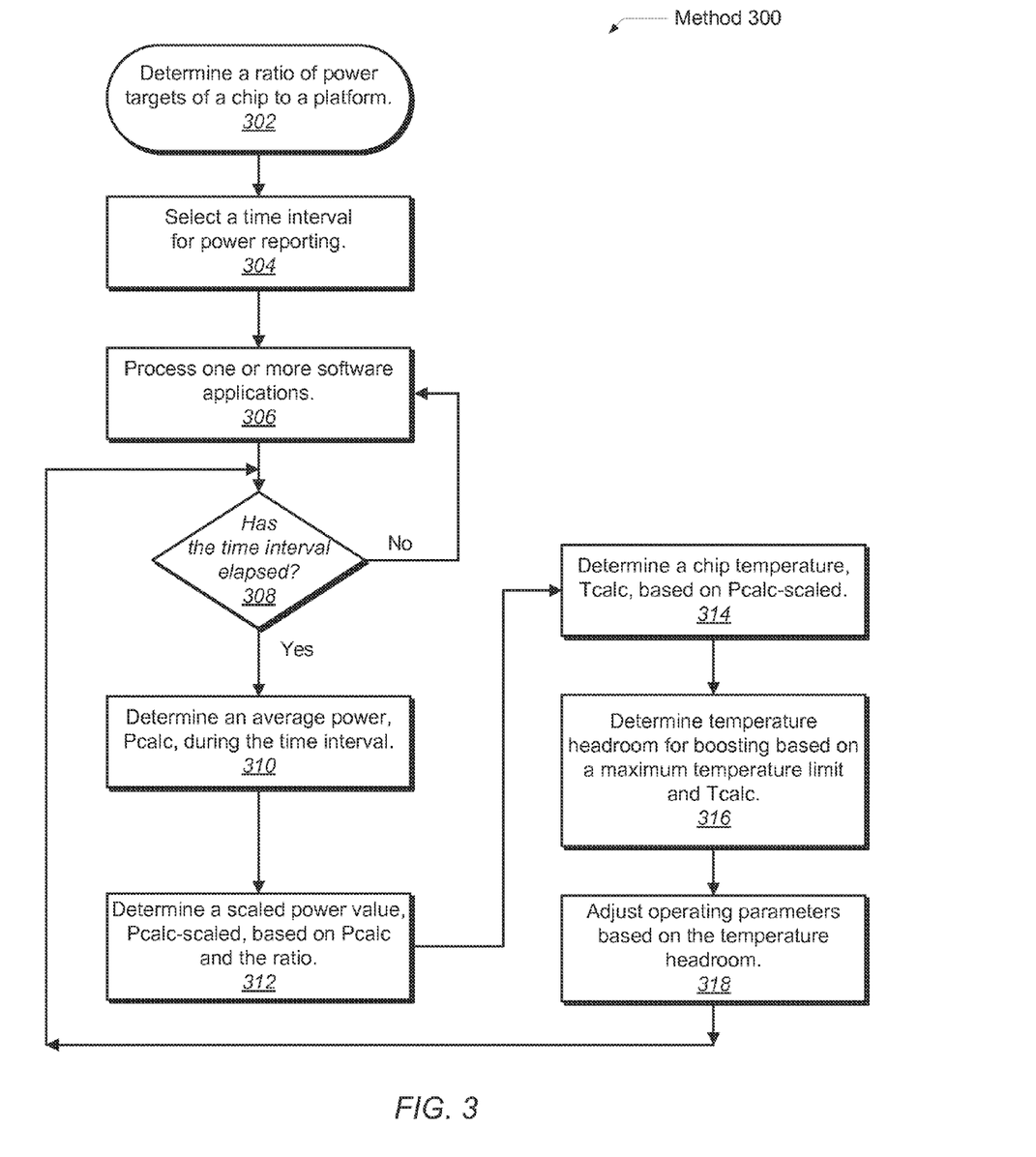
FIG. 3 is a generalized flow diagram of one embodiment of a method for boosting performance when differences exist between platform and chip thermal capabilities.

Referring now to FIG. 3, one embodiment of a method 300 for boosting performance when differences exist between platform and chip thermal capabilities is shown. For purposes of discussion, the steps in this embodiment are shown in sequential order. However, some steps may occur in a different order than shown, some steps may be performed concurrently, some steps may be combined with other steps, and some steps may be absent in another embodiment.

In block 302, a ratio of the nominal thermal design power (TDP) value of a semiconductor chip to a platform TDP value is determined. The TDP values may be stored in corresponding locations such as configuration and status registers, fuses, BIOS, and so forth. The ratio may be stored in the semiconductor chip, such as in a power manager. Alternatively, the ratio may be stored in an off-chip power management unit. The ratio may be used as a scalar value to scale a calculated power value determined during processing of software applications. In block 304, the semiconductor chip may receive requested time interval(s) for power reporting from an external agent, such as the operating system or another chip or computation unit. Alternatively, the semiconductor chip may have the time interval for power reporting stored in configuration and status registers, in BIOS, or in firmware.

In block 306, the semiconductor chip loads and processes instructions of one or more software applications. In some embodiments, the semiconductor chip may have been processing applications before receiving values for the time interval. Control logic within the semiconductor chip may sample a number of pre-selected signals. The selection of which signals to sample during a particular clock cycle may correspond to how well the selection correlates to the amount of switching node capacitance within a given one of one or more processing units on the semiconductor chip.

If the time interval has elapsed (conditional block 308), then in block 310, a power value is calculated from reported activity levels that are based on sampling selected signals. In addition, a leakage power value may also be calculated. The power value and the leakage power value are summed to provide a total calculated power value, Pcalc. The leakage power value is dependent on a calculated temperature. The calculated temperature is determined by control logic utilizing a worst-case ambient temperature value. Therefore, when the actual ambient temperature is significantly different from the worst-case ambient temperature, the calculated power value, Pcalc, does not change.

In block 312, a scaled power value, Pcalc-scaled, is determined from the calculated power value, Pcalc, and the ratio of the nominal thermal design power (TDP) value of the semiconductor chip to the platform TDP value. For example, the platform may provide a heat sink, fans, and other power management solutions to dissipate 22 watts of power for the semiconductor chip. The semiconductor chip placed on the platform may have a nominal TDP value of 25 watts. Therefore, the scalar value is 25/22, or 1.136. In various embodiments, the scaled power value is a multiplicative product of the calculated power, Pcalc, and the ratio. For example, if the calculated power, Pcalc, is 22 watts, then the scaled power value, Pcalc-scaled, is 22 watts×(25/22), or 25 watts. The scalar value may provide fine-grained configurability of the scaled calculated power value. In some embodiments, the fine-grained configurability includes steps of 100 milliwatts (mW).

In block 314, a transient RC thermal model is used to translate the scaled calculated power value, Pcalc-scaled, to a calculated temperature value, Tcalc. The RC thermal model utilizes a worst-case ambient temperature. In block 316, the temperature headroom for boosting is determined by the difference between the maximum temperature limit, Tmax, and the calculated temperature value, Tcalc, or (Tmax−Tcalc). Using values in earlier examples, Tmax is 100 degrees Celsius. The value Tmeas may be 98 degrees Celsius. Therefore, the temperature headroom is (Tmax−Tcalc). The calculated temperature may be at Tmax or very close, which does not provide a significant temperature headroom for boosting. However, the scaled calculated power value, Pcalc-scaled, allows for higher performance operation parameters to be selected than parameters that would be selected if the lower value, Pcalc, was used. In block 318, the operating parameters of one or more processing units are adjusted based on the temperature headroom and possibly on the allocation of power credits.

Figure 4:
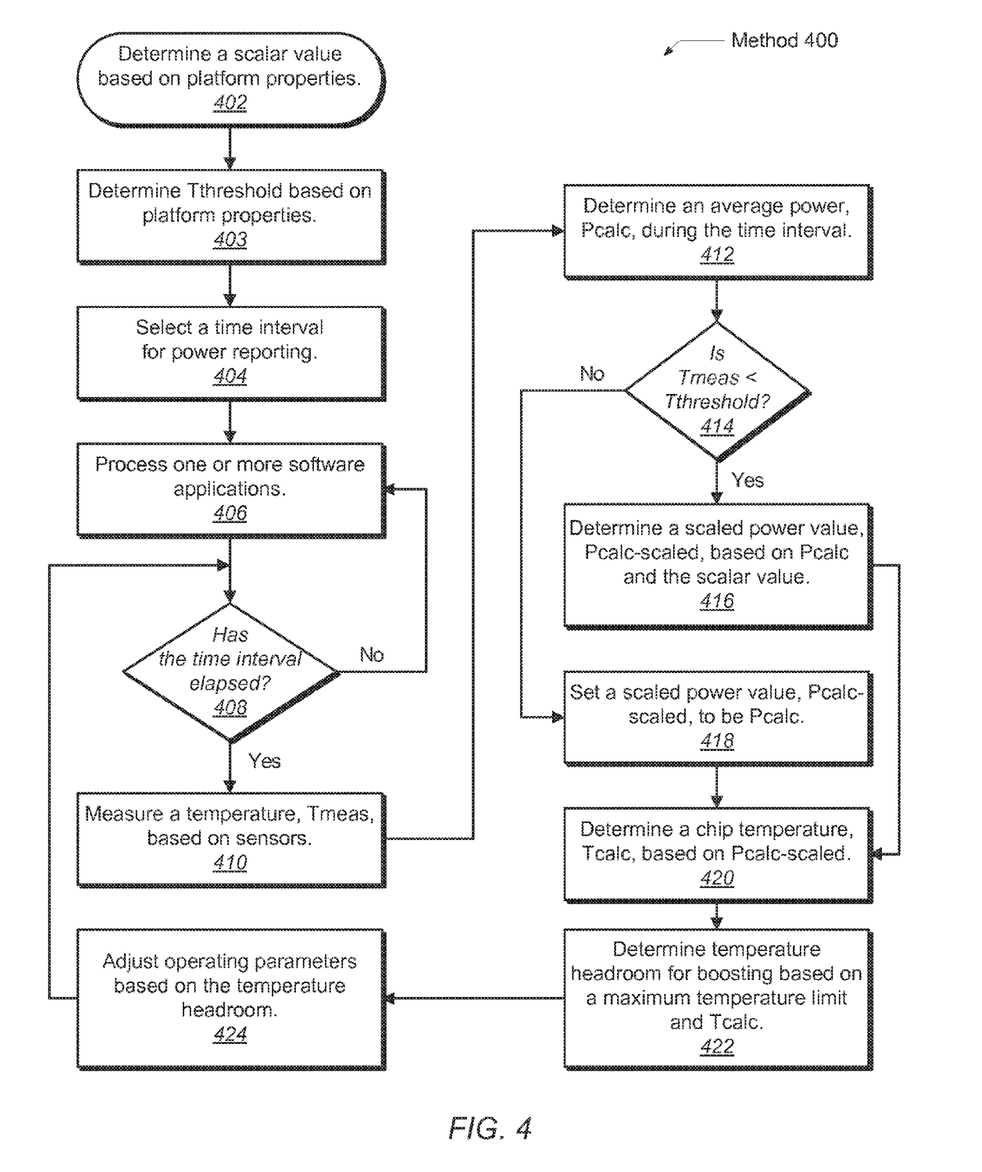
FIG. 4 is a generalized flow diagram of one embodiment of a method for boosting performance when worst-case temperature conditions are not present.

Referring now to FIG. 4, one embodiment of a method 400 for boosting performance when worst-case temperature conditions are not present is shown. For purposes of discussion, the steps in this embodiment are shown in sequential order. However, some steps may occur in a different order than shown, some steps may be performed concurrently, some steps may be combined with other steps, and some steps may be absent in another embodiment.

In block 402, a time interval is selected for power reporting on a semiconductor chip. Methods described earlier may be used for the selection. In block 404, the semiconductor chip loads and processes instructions of one or more software applications. Control logic within the semiconductor chip may sample a number of pre-selected signals during a particular clock cycle. The selected signals may correlate to the amount of switching node capacitance within a given one of one or more processing units on the semiconductor chip.

If the time interval has elapsed (conditional block 406), then in block 408, one or more on-die temperature sensors provide temperature measurements to read. The measurements may be combined into a single value, such as an average value. In block 410, a power value is calculated from reported activity levels that are based on sampling selected signals. In addition, a leakage power value may also be calculated. The power value and the leakage power value are summed to provide a total calculated power value, Pcalc. The leakage power value is dependent on a calculated temperature. The calculated temperature is determined by control logic utilizing a worst-case ambient temperature value. Therefore, when the actual ambient temperature is significantly different from the worst-case ambient temperature, the calculated power value, Pcalc, does not change.

In block 412, a ratio of the nominal thermal design power (TDP) value of the semiconductor chip to the calculated power value, Pcalc, is determined. The nominal TDP value may be stored in fuse of the chip. The ratio may be stored in the semiconductor chip, such as in a power manager. Alternatively, the ratio may be stored in an off-chip power management unit. The ratio may be used as a scalar value to scale the calculated power value determined during processing of software applications.

In block 414, a scaled power value, Pcalc-scaled, is determined from the calculated power value, Pcalc, and the ratio of the nominal thermal design power (TDP) value of the semiconductor chip to the calculated power value, Pcalc. For example, the calculated power value, Pcalc, may be determined to be 38.5 watts. The chip nominal TDP value may be 35 watts. The ratio is determined to be (35/38.5), or 0.91. The scaled power value, Pcalc-scaled, is determined to be 0.91×38.5 watts, or 35 watts. The scalar value may provide fine-grained configurability of the scaled calculated power value. In some embodiments, the fine-grained configurability includes steps of 100 milliwatts (mW). In various embodiments, this ratio may be additionally used with the scalar value described in method 300.

In block 416, a transient RC thermal model is used to translate the scaled calculated power value, Pcalc-scaled, to a calculated temperature value, Tcalc. The RC thermal model utilizes a worst-case ambient temperature. If the measured temperature, Tmeas, exceeds the threshold (conditional block 418), then in block 420, the temperature headroom for boosting is determined by the difference between the maximum temperature limit, Tmax, and the calculated temperature value, Tcalc, or (Tmax−Tcalc). Using values in earlier examples, Tmax is 100 degrees Celsius and the threshold is 96 degrees Celsius. The value Tmeas may be 98 degrees Celsius and exceeds the threshold of 96 degrees Celsius. Therefore, the temperature headroom is (Tmax−Tcalc). The calculated temperature may be at Tmax or very close, which does not provide a significant temperature headroom for boosting.

If the measured temperature, Tmeas, does not exceed the threshold (conditional block 418), then in block 422, the temperature headroom for boosting is based on at least a maximum temperature limit, Tmax; room ambient temperature, Troom-ambient; and the on-die sensor errors. The temperature headroom may be represented by the expression:

$$T\text{max}-(T\text{calc}-T\text{extra-margin})=(T\text{max}-T\text{calc})+T\text{extra-margin}$$

The value Textra-margin may be represented by the expression:

$$(T\text{worst-case-ambient}-T\text{room-ambient})-T\text{under-reporting}-T\text{over-reporting}=(T\text{worst-case-ambient}-T\text{room-ambient})-(|T\text{under-reporting}|+|T\text{over-reporting}|)$$

Using the values of earlier examples, Tmax is 100 degrees Celsius and the threshold is 96 degrees Celsius. The value Tmeas may be 94 degrees Celsius and does not exceed the threshold of 96 degrees Celsius. Therefore, the temperature headroom is (Tmax−Tcalc)+Textra-margin, wherein the value Textra-margin is (35−23)−(4+4)=12−8=4 degrees Celsius. The temperature headroom becomes (100−94)+4=10 degrees Celsius. In block 424, the operating parameters of one or more processing units are adjusted based on the temperature headroom and possibly on the allocation of power credits.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

Additionally, program instructions may comprise behavioral-level description or register-transfer level (RTL) descriptions of the hardware functionality in a high level programming language such as C, or a design language (HDL) such as Verilog, VHDL, or database format such as GDS II stream format (GDSII). In some cases the description may be read by a synthesis tool, which may synthesize the description to produce a netlist comprising a list of gates from a synthesis library. The netlist comprises a set of gates, which also represent the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. Alternatively, the instructions on the computer accessible storage medium may be the netlist (with or without the synthesis library) or the data set, as desired. Additionally, the instructions may be utilized for purposes of emulation by a hardware based type emulator from such vendors as Cadence®, EVE®, and Mentor Graphics®.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A semiconductor chip comprising:
one or more processing units, each operating with respective operating parameters;
a power manager configured to:
receive a sensor measured temperature of the one or more processing units;
determine whether or not an ambient temperature is to be used when adjusting the respective operating parameters;
use the ambient temperature when adjusting the respective operating parameters in response to detecting a first condition; and
exclude the ambient temperature when adjusting the respective operating parameters in response to detecting a second condition.

2. The semiconductor chip as recited in claim 1, wherein:
the first condition is the sensor measured temperature does not exceed a temperature threshold; and
the second condition is the sensor measured temperature exceeds the temperature threshold.

3. The semiconductor chip as recited in claim 2, wherein the power manager is further configured to determine a calculated power based on activity level data from each of the one or more processing units.

4. The semiconductor chip as recited in claim 2, wherein the temperature threshold is based on a difference between a maximum temperature limit and an under-reporting error of a temperature sensor used to determine the sensor measured temperature.

5. The semiconductor chip as recited in claim 2, wherein in response to detecting the second condition, the power manager is further configured to:
determine a calculated temperature based on the calculated power value and a worst-case ambient temperature;

determine a first difference between a maximum temperature limit and the calculated temperature; and adjust the respective operating parameters based at least in part on the first difference.

6. The semiconductor chip as recited in claim 2, wherein in response to detecting the first condition, the power manager is configured to use the ambient temperature to determine a boosted power-performance state (P-state) for the one or more processing units, wherein said boosted P-state is a higher P-state than a P-state that would be determined without using the ambient temperature.

7. The semiconductor chip as recited in claim 6, wherein in response to detecting the first condition, the power manager is further configured to:
   determine a first boost value based on the maximum temperature limit and the sensor measured temperature;
   determine an extra boost value based at least in part on the ambient temperature;
   determine a total boost value based on a sum of the first boost value and the extra boost value; and
   adjust the respective operating parameters to select the boosted P-state using the total boost value.

8. A method comprising:
   receiving a sensor measured temperature of one or more processing units, each operating with respective operating parameters;
   determining whether or not an ambient temperature is to be used when adjusting the respective operating parameters;
   using the ambient temperature when adjusting the respective operating parameters in response to detecting a first condition; and
   excluding the ambient temperature when adjusting the respective operating parameters in response to detecting a second condition.

9. The method as recited in claim 8, wherein:
   the first condition is the sensor measured temperature does not exceed a temperature threshold; and
   the second condition is the sensor measured temperature exceeds the temperature threshold.

10. The method as recited in claim 9, wherein the method further comprises determining a calculated power based on activity level data from each of the one or more processing units.

11. The method as recited in claim 9, wherein the temperature threshold is based on a difference between a maximum temperature limit and an under-reporting error of a temperature sensor used to determine the sensor measured temperature.

12. The method as recited in claim 9, wherein in response to detecting the second condition, the method further comprises:
   determining a calculated temperature based on the calculated power value and a worst-case ambient temperature;
   determining a first difference between a maximum temperature limit and the calculated temperature; and
   adjusting the respective operating parameters based at least in part on the first difference.

13. The method as recited in claim 9, wherein in response to detecting the first condition, the method further comprises using the ambient temperature to determine a boosted power-performance state (P-state) for the one or more processing units, wherein said boosted P-state is a higher P-state than a P-state that would be determined without using the ambient temperature.

14. The method as recited in claim 13, wherein in response to detecting the first condition, the method further comprises:
   determining a first boost value based on the maximum temperature limit and the sensor measured temperature;
   determining an extra boost value based at least in part on the ambient temperature;
   determining a total boost value based on a sum of the first boost value and the extra boost value; and
   adjusting the respective operating parameters to select the boosted P-state using the total boost value.

15. An on-die power management system comprising:
   an input adjuster unit; and
   an operation parameter selector; and
   wherein the input adjuster unit is configured to:
      receive a sensor measured temperature of one or more processing units, each operating with respective operating parameters; and
      determine whether or not an ambient temperature is to be used when adjusting the respective operating parameters;
   wherein the operation parameter selector is configured to:
      use the ambient temperature when adjusting the respective operating parameters in response to detecting a first condition; and
      exclude the ambient temperature when adjusting the respective operating parameters in response to detecting a second condition.

16. The power management system as recited in claim 15, wherein:
   the first condition is the sensor measured temperature does not exceed a temperature threshold; and
   the second condition is the sensor measured temperature exceeds the temperature threshold.

17. The power management system as recited in claim 16, wherein in response to detecting the first condition, the operation parameter selector is configured to use the ambient temperature to determine a boosted power-performance state (P-state) for the one or more processing units, wherein said boosted P-state is a higher P-state than a P-state that would be determined without using the ambient temperature.

* * * * *